Sept. 17, 1929.   F. E. CROTTO   1,728,173
WIRE LINE CLAMP
Filed Oct. 13, 1928   3 Sheets-Sheet 1

INVENTOR
F. E. CROTTO
BY
ATTORNEY

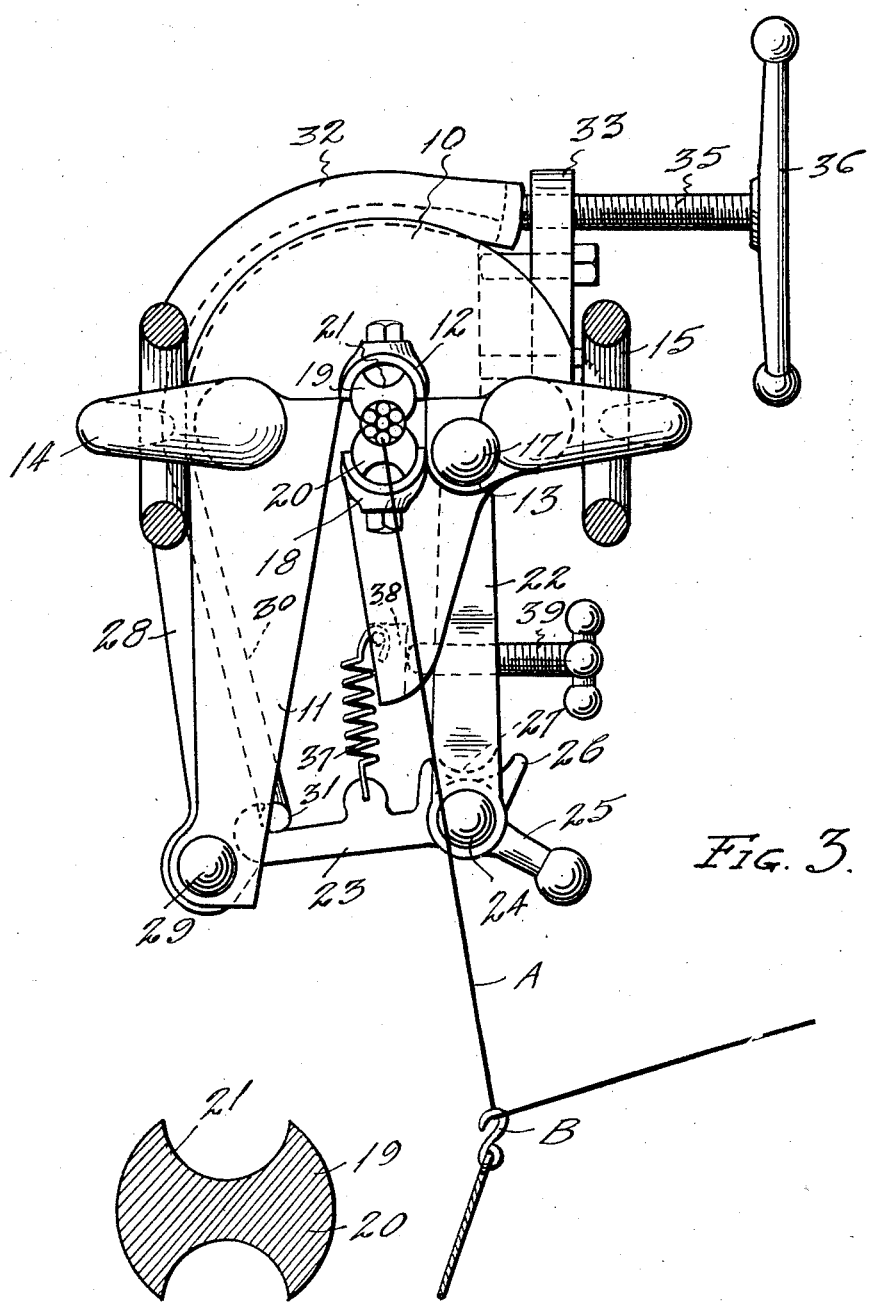

Patented Sept. 17, 1929

1,728,173

UNITED STATES PATENT OFFICE

FRANK E. CROTTO, OF TULSA, OKLAHOMA, ASSIGNOR TO WESTERN SUPPLY COMPANY, OF TULSA, OKLAHOMA, A CORPORATION OF OKLAHOMA

WIRE-LINE CLAMP

Application filed October 13, 1928. Serial No. 312,286.

This invention relates to new and useful improvements in wire line clamps.

One object of the invention is to provide a clamp in which the wire line may be bridled over one of the liners instead of over the joint between the liners; whereby fouling the line and frequently injuring the same is avoided.

Another object of the invention is to provide a wire line clamp having an elongated lever for swinging the arms together and clamping the line, thus securing a maximum leverage upon a minimum travel of the lever.

A further object of the invention is to provide a curved adjusting lever and an adjusting screw bearing against one end of the lever, whereby the end thrust of the screw is contributed to the curved end of said lever and the latter adjusted by a slight movement contiguous to and around the body of the clamp, thus resulting in a more convenient locating of the adjusting screw and a better balancing of the clamp.

Still another object of the invention is to provide a pair of reversible liners formed from bar stock and easily grooved; also readily interchanged, together with means for making adjustments to compensate the wear of the liner grooves.

A construction designed to carry out the invention will be hereinafter described, together with other features of the invention.

The invention will be more readily understood from a reading of the following specification and by reference to the accompanying drawings, in which an example of the invention is shown, and wherein:

Fig. 3 is a plan view of the same, and

Fig. 4 is a sectional view of one of the liners.

Figure 1:
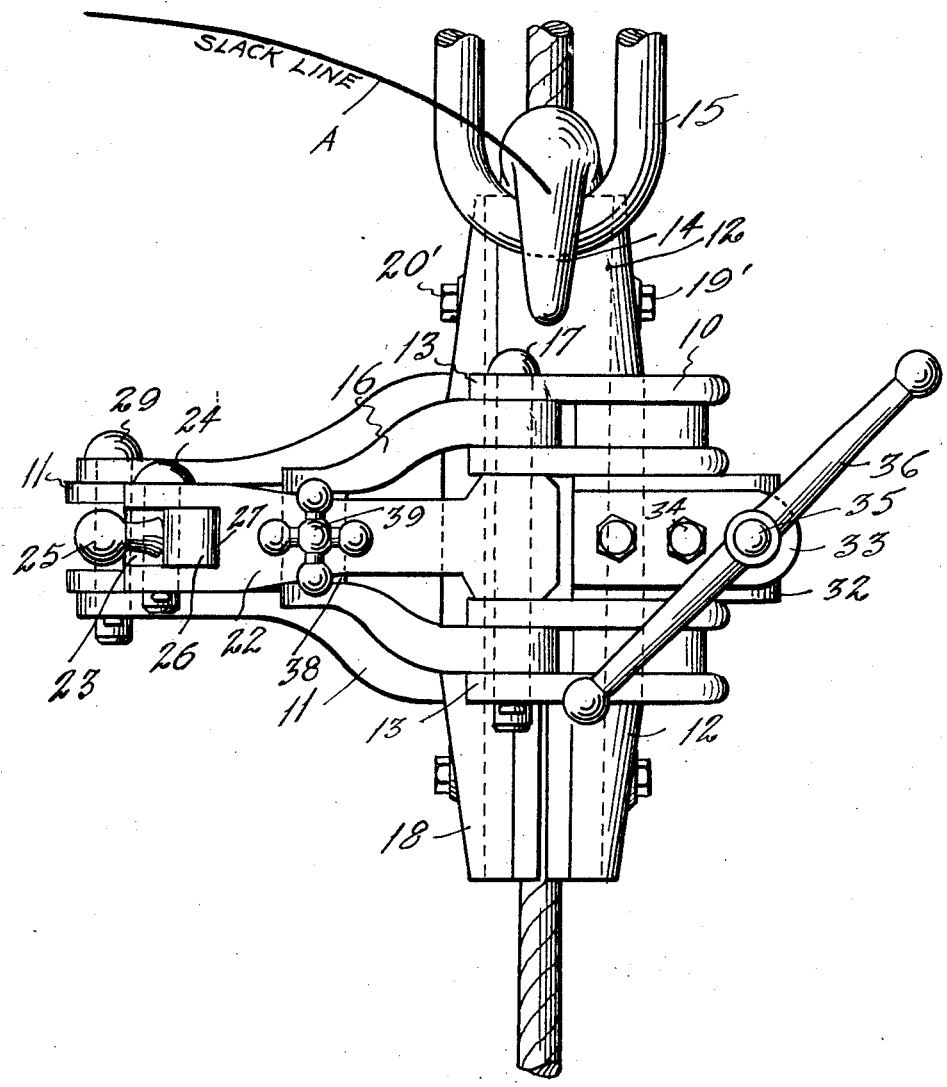
Fig. 1 is a side elevation of a wire line clamp constructed in accordance with the invention.
Figure 2:
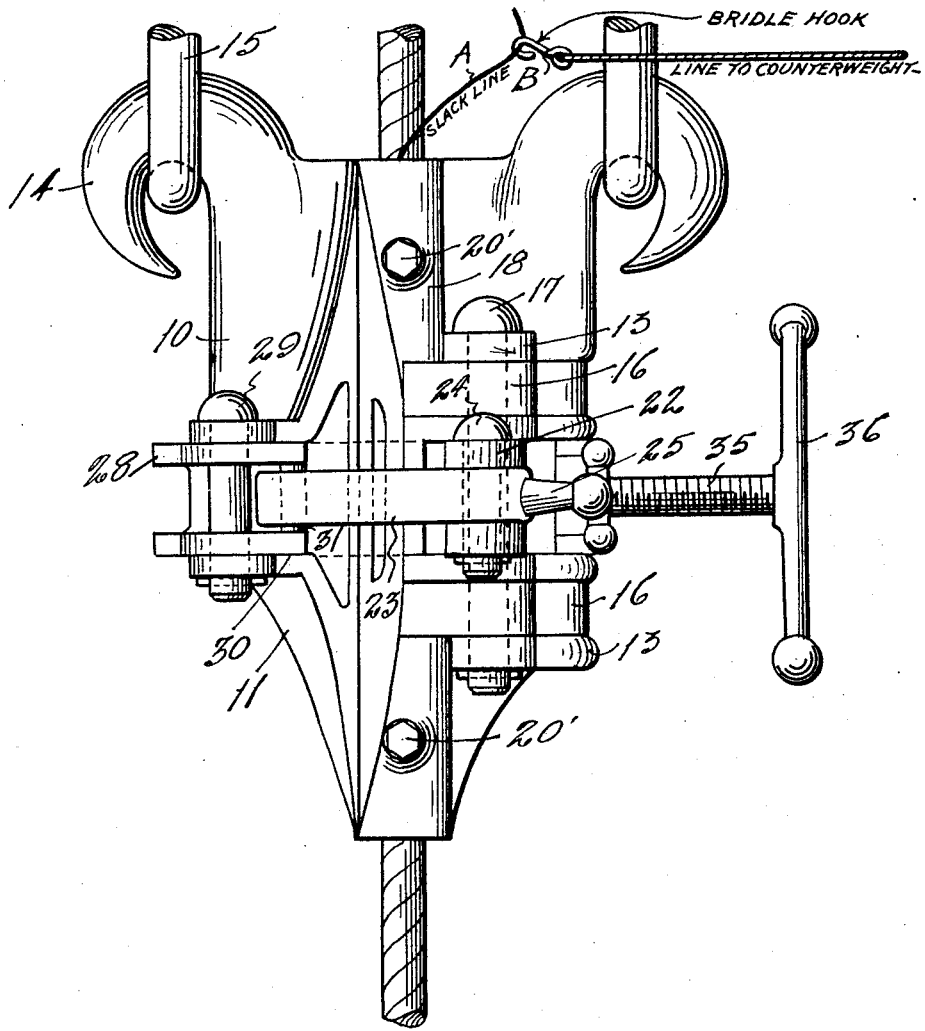
Fig. 2 is a front elevation of the same.

In the drawings the numeral 10 designates a yoke shaped body including an outwardly directed arm 11. At the center of the body is formed a concaved vertical liner boss 12, the inner side of the arm extending from one side of said boss and spaced ears 13 extending from the opposite side of the boss. Hooks 14 are provided on each side of the body for receiving the temper-screw links 15.

As is shown in Fig. 1 two pairs of ears 13 are provided and a liner yoke arm 16 has its inner ends hinged between the ears on a pin 17. The yoke arm has an integral vertical liner boss 18 extending above and below said arm, and also being concaved. The boss 12 has a liner 19 fastened therein by screws 19', while the boss 18 has a liner 20 fastened therein by screws 20'.

The liners are an important part of the invention and are duplicates. Each is formed by a cylindrical bar provided with diametrical opposite longitudinal concaved grooves 21. When one groove becomes worn the liner may be reversed and the other groove used.

Upon swinging the arm 16 toward the arm 11, the liner 20 will receive the cable in its groove 21 and seat said cable in its groove 21 of the liner 19. Owing to the convex surfaces of the liners and the concaved grooves 21 only thin edges of metal will engage when the liners are swung together, thus by dressing off these vertical edges sufficient clearance is provided to cause the liners to firmly grip the cable or line and not interfere with each other.

A swinging arm 22 has its inner end hinged on the pin 17 between the ears 13. A latch lever 23 is hinged on a pin 24 in the forked outer end of the arm 22. The lever has a divergent handle 25, whereby it may be manually swung. The swinging of the lever is limited by a fork 26 disposed about a boss 27.

A gate lever 28 has a pair of spaced ears at one end hinged on a pin 29 in a recess 30 formed in the arm 11. The arm carries a keeper 31 positioned between the ears for receiving the hook on the latch lever 23. The lever 28 extends from the recess 30 and has a curved bill 32 contiguous to the body 10.

A nut 33 is removably fastened to the body by screws 34, so as to extend in proximity to the end of the bill 33 of the gate lever. This nut may be renewed when necessary. A gate or operating screw 35 is threaded through the nut and has a rounded end bearing on the end of the bill. The screw has a large handle bar 36, whereby it may be easily rotated.

It will be seen that by rotating the screw 35 in a clockwise direction, the lever 28 will be swung about its pin 29. The keeper 31 being inwardly of the pin, will be swung thus drawing the arm 22 toward the arm 11 through the agency of the lever 23. The latch lever is held to the keeper by a coiled spring 37 extending from the lever to a web 38 on the end of the yoke arm 16.

A take-up screw 39 threaded through the swinging arm has a rounded end bearing on the web 38; thus when the arm 22 is swung toward the arm 11, the arm 16 is swung therewith. When the lever 23 is disengaged from the keeper 31, the spring 37 will tend to swing said lever toward the arm 16, but the fork 26 will engage the boss 27, thus limiting the swing of said lever and also establishing a connection between the arms 16 and 22, whereby they will be swung in unison.

When the grooves 21 in the liners 19 and 20 wear, compensation is made by adjusting the screw 39 inwardly, whereby the arm 16 is moved closer to the boss 12. It is pointed out that a very limited adjustment of the screw 35 will swing the lever 28 a sufficient distance to draw the arms 11 and 22 together and clamp the cable, owing to the amplified leverage and the location of the parts.

The operation is as follows:

The operating screw 35 is rotated in a counter-clockwise direction, whereby the lever 28 is released sufficiently to allow the latch lever 23 to be disengaged from the keeper 31. The handle 25 is used to disengage the lever and also to swing the arm 22 outwardly from the arm 11, thus opening up the throat of the clamp. The arm 22 swings the arm 16 and liner 20 away from the liner 19.

The clamp thus being opened, the cable or wire line may now be engaged by swinging the body so that the line is received in the throat and sealed in the groove 21 of the liner 19. When the parts are in position the operator grasps the handle 25 and swings the arms 22 and 16 and engages the lever 23 with the keeper 31. This brings the liner 20 into engagement with the cable.

The operator next rotates the screw 35 in a clockwise direction whereby the lever 28 is swung and the lever 23 is tensioned. This causes the liners to firmly grip the line. The line is offset from the pin 17 so that the pressure on both sides of said line is equal and pinching is eliminated. Minute adjustments of the screws 35 and 39 will have marked effect upon the parts controlled thereby and a large amount of wear may be compensated.

In the various figures of the drawings I have indicated in dotted lines A the position of the wire line when engaged by the bridle hook B. As is shown in Fig. 3 the line bridles over the liner 20 instead of over the joint between the liners. This is a particular advantage as it prevents fouling or injuring the line.

Various changes in the size and shape of the different parts, as well as modifications and alterations, may be made within the scope of the appended claims.

What I claim, is:

1. In a wire line clamp, a body having means for engaging a wire line, a rigid arm extending from one side of the body, a swinging arm hinged to the body, a line engaging member actuated by the swinging arm and co-acting with the line engaging means of the body to clamp a line, a latch lever carried by the swinging arm, a gate lever mounted on the rigid arm and engaged by the latch lever, and an operating screw mounted on the body and engaging the gate lever to swing the same.

2. In a wire line clamp, a body having a wire line liner, a rigid arm extending from one side of the body, a swinging arm hinged to the body, a liner support carrying a liner and actuated by the swinging arm into clamping relation to the liner of the body, a latch lever carried by the swinging arm, a gate lever having one end pivoted to the outer end of the rigid arm and engaged by the latch lever, and an operating screw mounted on the body and engaging the swinging end of gate lever to swing the same.

3. In a wire line clamp, a body having a wire line liner, a rigid arm extending from one side of the body, a swinging arm hinged to the body, a liner support carrying a liner and actuated by the swinging arm into clamping relation to the liner of the body, a latch lever carried by the swinging arm, a gate lever having one end pivoted to the outer end of the rigid arm and engaged by the latch lever, an operating screw mounted on the body and engaging the swinging end of gate lever to swing the same, and means for adjusting the liner support with relation to the swinging arm to compensate the wear of the liners.

4. In a wire line clamp, a body having a wire line liner, a rigid arm extending from one side of the body, a swinging arm hinged to the other side of the body, a gate lever having one end hinged to the outer end of the rigid arm, means connecting the hinged end of the gate lever with the swinging arm, the lever lying contiguous to the body and having its free end extending transversely across the body, and an operating screw mounted on the opposite side of the body from the rigid arm and engaging the free end of the lever for swinging the same.

5. In a wire line clamp, a body, a reversible liner mounted in the body, a rigid arm extending from the body, a liner arm carried by the body, a reversible liner carried by the liner arm, a swinging arm hinged on the body, a take-up screw carried by the swinging arm and engaging the liner arm, and means for bringing the rigid and swing arms together to bring the liners into clamping engagement with a wire line.

6. In a wire line clamp, a body, a reversible liner mounted in the body, a rigid arm extending from the body, a liner arm carried by the body, a reversible liner carried by the liner arm, a swinging arm hinged on the body, a take-up screw carried by the swinging arm and engaging the liner arm, a latch lever pivoted on the outer end of the swinging arm, a coiled spring connecting the latch lever with the liner arm, and an operating lever engaging the latch lever.

7. In a wire line clamp, a body having a wire line seat, a rigid arm extending from the body, a swinging arm hinged to the body adjacent the swinging arm and carrying a line seat, a latch lever pivoted in the outer end of the swinging arm, a handle extending from the latch lever, a stop on the latch lever engaging the swinging arm to limit the swing of said lever, a coiled spring connecting the latch lever with the yoke arm, and an operating lever engaged by the latch lever.

8. In a wire line clamp, a yoke shaped body having a wire line seat, a rigid arm extending from the body, a gate pivoted at one end to the outer end of the rigid arm and having a bill curved around body, an operating screw mounted on the body and engaging the end of the bill, a swinging arm mounted on the body for clamping a line in the seat of the body, and a latch lever carried by the swinging arm and engaging the gate lever.

9. In a wire line clamp, a body having a vertical liner boss extending above and below, a liner removably mounted in the body boss, a rigid arm extending from the body at one side of the boss, a swinging arm hinged to the body at the opposite side of the boss thereof, a yoke arm hinged to the body and having a vertical liner boss, a liner removably mounted in the boss of the yoke arm and co-acting with the body liner to clamp a line, a take-up screw mounted on the swinging arm and engaging the yoke arm for adjusting the latter to compensate the wear of the slips, and means for fastening the swinging arm in place.

10. In a wire line clamp, a body having arms and wire line clamping means, a lever mounted on the body for swinging the arms together to operate the clamping means, a nut removably fastened on the body, and an operating screw mounted in the nut and engaging the free end of the lever for swinging the lever.

In testimony whereof I affix my signature.

FRANK E. CROTTO.